(12) United States Patent
Henderson et al.

(10) Patent No.: US 6,991,256 B2
(45) Date of Patent: Jan. 31, 2006

(54) QUICK CONNECT CUSHION MOUNTING SYSTEM

(75) Inventors: David Henderson, Ogden, UT (US); Kurt Petersen, Wellsville, UT (US); Vince Bennett, Liberty, UT (US)

(73) Assignee: Autoliv ASP, Inc., Ogden, UT (US)

( * ) Notice: Subject to any disclaimer, the term of this patent is extended or adjusted under 35 U.S.C. 154(b) by 102 days.

(21) Appl. No.: 10/354,725

(22) Filed: Jan. 30, 2003

(65) Prior Publication Data
US 2004/0150196 A1    Aug. 5, 2004

(51) Int. Cl.
*B60R 21/22* (2006.01)
(52) U.S. Cl. .................................... 280/730.2; 411/176
(58) Field of Classification Search ............... 280/727, 280/728.1, 728.2, 730.2; 411/22, 29, 176, 411/339
See application file for complete search history.

(56) References Cited

U.S. PATENT DOCUMENTS

| 4,710,852 | A | * | 12/1987 | Keen ........................... 361/717 |
| 5,141,247 | A | * | 8/1992 | Barth ........................ 280/728.2 |
| 5,615,907 | A | * | 4/1997 | Stanger .................... 280/728.2 |
| 5,899,486 | A | | 5/1999 | Ibe |
| 6,022,044 | A | * | 2/2000 | Cherry ..................... 280/730.2 |
| 6,227,561 | B1 | | 5/2001 | Jost et al. |
| 6,231,068 | B1 | * | 5/2001 | White et al. ............. 280/728.2 |
| 6,234,517 | B1 | * | 5/2001 | Miyahara et al. ........ 280/730.2 |
| 6,260,878 | B1 | * | 7/2001 | Tanase ..................... 280/730.2 |
| 6,595,547 | B2 | * | 7/2003 | Smith ......................... 280/736 |
| 6,705,635 | B2 | * | 3/2004 | Hoeft et al. ............. 280/728.2 |
| 6,796,576 | B2 | * | 9/2004 | Aoki et al. .............. 280/730.2 |
| 2003/0205887 | A1 | * | 11/2003 | Wallner et al. .......... 280/730.2 |

FOREIGN PATENT DOCUMENTS

| DE | 196 22 231 | 12/1997 |
| EP | 0 855 316 | 7/1998 |
| WO | WO - 02/28690 | 4/2002 |

* cited by examiner

*Primary Examiner*—Ruth Ilan
*Assistant Examiner*—Toan C. To
(74) *Attorney, Agent, or Firm*—Sally J. Brown (57) ABSTRACT

A mounting system and method of attaching an a side impact curtain airbag to a vehicle is provided that is inexpensive, simple to use, and does not require fasteners or other connectors. The mounting system includes one or more airbag mounts comprising a plate that has been positioned within the vehicle. The plate may a separate structure that may be attached to a vehicle as a well as a surface of the vehicle's body to which an airbag may be attached. Preferably, the plate includes one or more first tabs and one or more second tabs which are configured to define a receiving area in the plate. The first and second tabs are also configured such that the second tabs are inverted relative to the first tabs. An airbag with one or more slits and a hemmed portion may also be added to the mounting system. The mounting system operates to attach the curtain airbag by having the first and second tabs configured such that the airbag engages the first and second tabs so as to bind a portion of the airbag's hemmed portion within the receiving area formed into the plate.

40 Claims, 5 Drawing Sheets

QUICK CONNECT CUSHION MOUNTING SYSTEM

BACKGROUND OF THE INVENTION

1. Field of the Invention

The present invention relates to attaching an airbag to the interior of a vehicle. More specifically, the present invention relates to novel methods and apparatus for attaching an inflatable cushion airbag to an interior surface of a vehicle.

2. Description of Related Art

Inflatable airbags are well accepted for use in motor vehicles and have been credited with preventing numerous deaths and injuries. In fact, the inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of a pyrotechnic charge. Expanding gases from the charge fill the airbags, which immediately inflate in front of the driver and passenger to protect them from impact against the windshield. Side impact airbags have also been developed in response to the need for similar protection from impacts in a lateral direction, or against the side of the vehicle.

Recently, airbag technology has continued to advance such that curtain airbags are now enlisted to provide roll-over protection as well as side impact protection. During a roll-over accident, the vehicle occupants can be jostled considerably, thereby causing the occupant to impact various parts of the vehicle interior. Even worse, the occupant may be ejected from the vehicle. Alternatively, a head or limb of an occupant may extend outside the vehicle during the roll-over. Such "occupant excursion" during roll-over accidents is a common cause of automotive fatality, particularly in the case of vehicle occupants that are not wearing a seat belt during the roll-over.

Conventional curtain airbags attempt to combat the dangers of side impact or roll-over accidents by having a curtain airbag unroll or unfold downward from the roof of the vehicle and then inflate beside the person as a means of preventing the person from hitting the door or window. Since a vehicle occupant may be leaning forward, reclined in the seat, or at any position in between, such curtain airbags are usually designed to be long enough to cover the whole interior side of the vehicle, protecting occupants in both front and rear passenger compartments.

To provide side impact and roll-over protection, curtain airbags are sized to hold large volumes of inflation gas and descend below the window sill. Consequently, when not inflated, the curtain airbag includes a significant amount of airbag material. Generally, the material is rolled or folded tightly into a long tubular bundle. During the inflation process, the curtain unrolls or unfolds along a side of the vehicle. The curtain may be kept rolled or folded by a sock that fits around the curtain.

To function properly, the curtain is stored and mounted either on or proximate a roof rail of the vehicle. When the curtain is inflated, the curtain breaks through the sock and descends. Inflation gas fills the curtain from the top of the vehicle toward the bottom. Typically, the curtain airbag is mounted to the roof rail or other parts of the vehicle by a plurality of connectors attached to cushion mount points. These connectors can take a variety of forms including fasteners, bolts, screws, rivets, hooks, rods, cables, brackets, push in clips, nails, cables, jigs, or the like. These fasteners secure the curtain to the vehicle during deployment. For example, in some curtains, an anchor mount point may be located at each end, and intermediate mount points may be dispersed at points in between. Generally, the mount points are portions of the curtain airbag which extend through the sock.

Generally, the roof rail is small and narrow. The area inboard of the roof rail is also small and narrow to provide an appealing and spacious vehicle interior for occupants. Thus, area where an inflatable curtain is installed is usually very narrow. Interior trim panels and/or a headliner typically conceal the inflatable curtain. The headliner is the material covering the interior roof, thereby making the roof of the vehicle more attractive to occupants. Typically, the headliner curves down along the sides of the roof and covers the roof rail. The edges of the headliner may be secured by door molding, trim, or the like.

The mount points are used to secure the curtain onto or proximate the roof rail of the vehicle. However, because of the size of the inflatable curtain and the small and narrow area around the roof rail and headliner, the installation of the airbag can be very difficult and cumbersome. For example, the contour and shape of the roof rail to which the curtain is mounted may cause the curtain to hang out away from the roof rail. Furthermore, the curtain may become pinched or bunched up by the headliner or trim causing an unsightly bulge or lump in the headliner. Alternatively, besides the inflatable curtain, various other components of the vehicle may also need to be installed in this space including assist grip handle brackets, hand grips, lighting fixtures, sun or moon roof brackets, hanger hook brackets, wiring, drain hoses, heating and ventilation (HVAC) controls, ducts and other parts. As such, even slight variations in the curtain's position may interfere with the installation of these components as well as the trim panels and headliner.

To address these issues, many airbag manufacturers presently employ a two step process for installing inflatable curtain airbags. First, the curtain must be held in place during the installation process. This can be done by either having multiple workers hold the airbag or by attaching the airbag to sophisticated jigs, hooks, or mounting brackets that have been placed into slots in the body of the vehicle. Once the airbag has been secured in the proper position, the workers are free to bolt the curtain airbag assembly to the vehicle using a connectors such as fasteners, bolts, screws, rivets, hooks, rods, cables, brackets, push in clips, nails, cables, jigs, or the like. Usually these connectors are threaded into holes, slits, or apertures that have been put into the top of the curtain airbag to facilitate the assembly process.

Unfortunately, this two step installation process poses serious cost and time constraints on airbag and vehicle manufacturers. Even if they work together, it will likely take multiple employees several minutes to install each unit using this method as they will have to position the airbag, thread each connector into the appropriate hole, and then tighten each connector to the appropriate load. As the manufacturer incurs costs for every moment that passes during the manufacturing process, these several minutes significantly affect the total production costs and the manufacturer's overall profit margin.

Moreover, the use of connectors to attach the curtain airbag to the vehicle creates additional problems for airbag and vehicle manufacturers. For example, such connectors increase the total number of parts required to produce the vehicle and each additional part has associated manufacturing, tooling, and design costs. Other connectors add bulk to the airbag such that the manufacturers cannot easily fold or position the airbag within the vehicle. Still other connectors have a tendency to damage the airbag, thereby requiring manufacturers to employ valuable resources in repairing and replacing damaged airbags.

Yet further, some connectors have been found to be difficult to use or install on the vehicles. Specifically, bolt/nut combinations require access to a rear portion of a vehicle surface in order to effect attachment, thereby requiring the manufacturer to delay assembly of other parts of the vehicle to accommodate installation of the cushion member. Other connectors such as screws or bolts may need to be threaded through the proper holes and tightened. The tightening process may require that an operator use considerable care to tighten each connector to the appropriate load. Even when non-threaded connectors are used, many known devices must be oriented with some care before they can provide effective fastening. As a result, installation personnel must not only keep the cushion member properly aligned with the vehicle surface, but must simultaneously rotationally align the connector with its mating portion of the vehicle surface.

Lastly, the use of many known connectors may negatively impact the customer's opinion of the both the airbag system and the vehicle in general. For example, some known connectors add to the weight of the vehicle, thereby reducing the overall handling, acceleration, and fuel economy of the vehicle. Still other known connectors often contain surfaces that rub undesirably against each other, thereby producing squeaks, rattling, or other disconcerting sounds. Such sounds may, for a common consumer, be interpreted as indicia of poor quality, even though the airbag cushion has been properly installed.

Accordingly, it would be an advancement in the art to create a novel apparatus and method for mounting a curtain airbag without the use of connectors such as fasteners, bolts, screws, rivets, hooks, rods, cables, brackets, push in clips, nails, cables, jigs, or the like. It would be a further advancement to provide an airbag attachment system that could mount the airbag to the vehicle in one single step. It would be another advancement to provide an airbag mounting system that holds the airbag tightly against the roof rail higher up against the roof rail such that the attached airbag does not occupy or interfere with the space needed to properly assemble the headliner. Additionally, it would be an advancement to provide an airbag mounting system that attaches the airbag to the vehicle quickly, easily, and inexpensively, thereby reducing the production costs, installation time, and the possibility of installation error.

SUMMARY OF THE INVENTION

The apparatus of the present invention has been developed in response to the present state of the art, and in particular, in response to the problems and needs in the art that have not yet been fully solved by currently available cushion attachment systems. Thus, it is an overall objective of the present invention to provide a mounting system and method for securely fastening a cushion member to a vehicle interior which is inexpensive to use, requires a minimum number of parts, reduces the overall assembly time, allows for a one step installation method, and increases the overall mounting effectiveness over existing systems.

In accordance with the present invention as embodied and broadly described herein in the preferred embodiment, a novel quick connect airbag mounting system is provided as well as methods for installing an airbag onto a vehicle. Specifically, the airbag mounting system and installation methods of the present invention operate to allow easy attachment of an inflatable curtain-type side impact airbag to an interior surface of a vehicle.

According to one embodiment, the mounting system of the present invention comprises one or more airbag mounts positioned within an interior of a vehicle. These airbag mounts are made to generally include a plate capable of mounting an airbag to a vehicle. As used herein the term "plate" means both a separate structure that may be attached to a vehicle as a well as a surface of the vehicle's body to which an airbag may be attached. Preferably, this plate is generally flat and is made of the same steel used to make the body of the vehicle. Other materials such as metal, plastic, steel, or the like may also be used.

The plate used in the airbag mounts is positioned on or proximate a side roof rail of a vehicle such that the airbag is mounted to the vehicle along a side roof rail of the vehicle. Such positioning of the plate may be accomplished by constructing the plate such that it comprises a surface of the vehicle's body. Alternatively, if the plate is a separate structure, the plate may be positioned along the roof rail by mounting the plate onto the body of the vehicle via methods known in the art such as through welding, gluing, using fasteners or other connectors, etc. Preferably, the plate is made to comprise a surface of the vehicle's body because such a configuration reduces the total cost and number of components required for the airbag system and allows for attachment of an airbag without the use of connectors.

The plate used in the airbag mounts also includes one or more first tabs and one or more second tabs. These tabs with the tips are configured such that an airbag can engage the first and second tabs such that a portion of the airbag becomes bound to the plate.

In general, the first and second tabs formed in the plate are positioned at or proximate the center of the plate and are configured to take on a generally rectangular shape. A tip may also be added to the distal ends of the tabs. Perhaps more importantly, the second tabs are inverted relative to the first tabs meaning that if the plate is properly installed on a vehicle, the second tabs face downwards whereas the first tabs face upwards.

The first tabs and the second tabs may be additionally configured such that they define a receiving area formed into the plate. This receiving area is an opening or aperture that has been configured within the plate to receive and retain a portion of the airbag. Preferably, the receiving area constitutes an opening or aperture located behind the first and second tabs that has been specifically sized to hold a portion of an airbag behind the first and second tabs.

In addition to a plate with first tabs and second tabs, the airbag mounting system of the present invention may optionally comprise a curtain airbag constructed of a flexible material such as a nylon fabric. The curtain airbag is made to generally have an inflating portion and a hemmed portion made from one or more layers of a flexible material such as a nylon fabric. Most preferably, the hemmed portion is positioned above the inflating portion and comprises one or more layers of the same nylon fabric used to make other portions of the airbag. If multiple layers of fabric are used to make the hemmed portion, the multiple layers of fabric are preferably connected together along a hem via sewing, stitching, gluing, heat staking, welding, or other methods known in the art.

The hemmed portion of the airbag is also made to comprise one or more slits. These slits are holes or openings in the airbag that are located between the hemmed portion and the inflating portion. Preferably, the slits are configured such that if the airbag is installed within the vehicle, the position of the slits corresponds directly to the position of the airbag mounts.

The airbag mounting system attaches an airbag by having the airbag engage the first and second tabs such that a portion of the airbag becomes bound to the plate. More specifically the first and second tabs are configured such that the airbag can engage the first and second tabs such that so as to bind a portion of the airbag's hemmed portion within the receiving area formed into the plate. Once the hemmed portion has been bound within the receiving area, the airbag mounting system is designed such that the airbag remains bound to the plate during the normal operation and life of the vehicle, as well as during an accident in which the airbag is deployed into the inflated configuration.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

Figure 1:
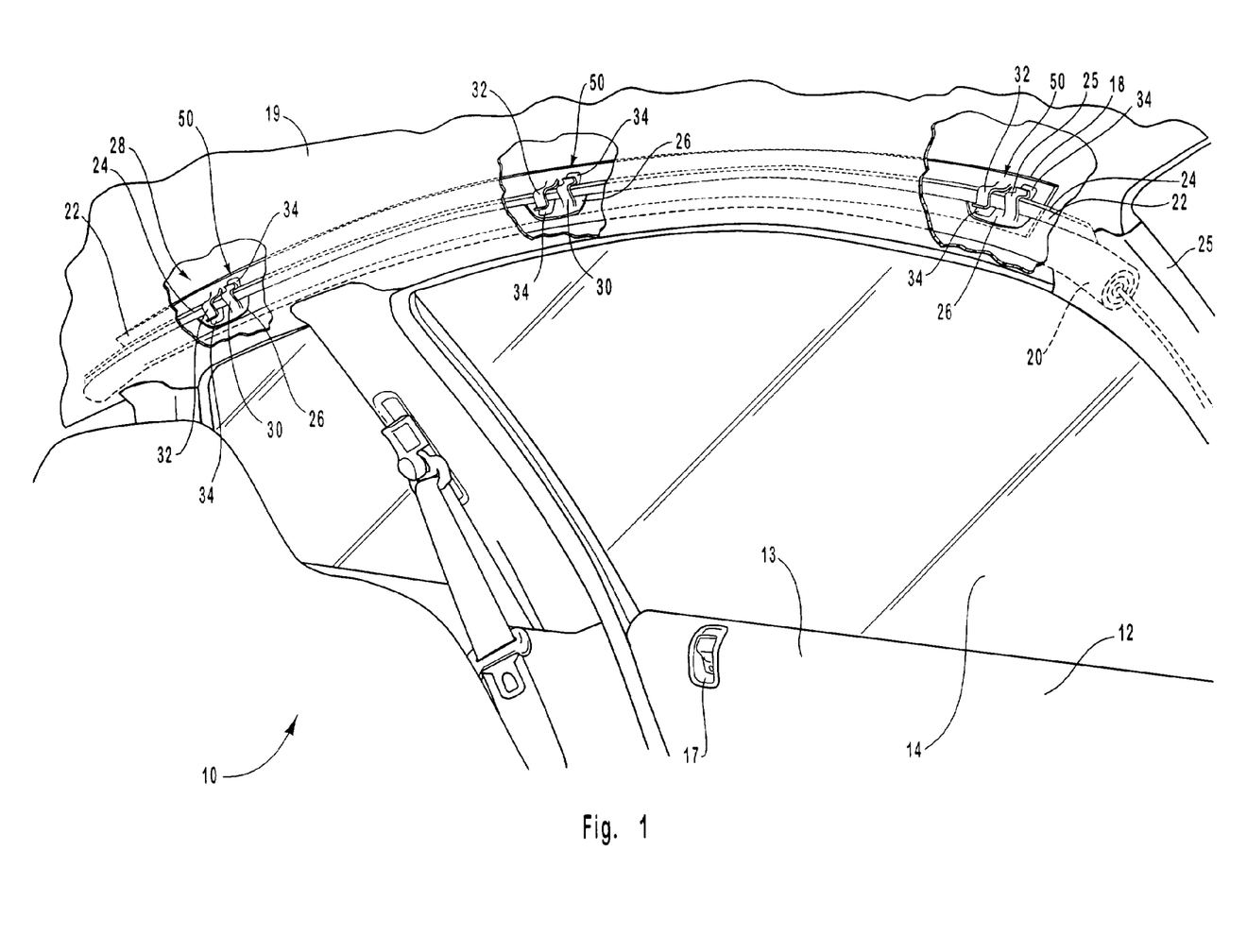
FIG. 1 is a perspective view of the interior of a vehicle illustrating one embodiment of the mounting system of the present invention with a curtain airbag in its stowed configuration mounted to a vehicle roof rail.

Referring to FIG. 1, a side curtain inflatable airbag 20 is illustrated attached to vehicle interior 10. Side curtain airbag 20 is attached to an inflator (not shown) which provides inflation gas and a sensor (not shown) which provides an initiation signal to initiate inflation of the curtain airbag 20 when an accident occurs.

Generally, the curtain airbag 20 is stored along a side roof rail 18 of the vehicle. The curtain airbag 20 is designed to inflate and substantially cover the lateral side 12, the door 13, the window 14, and the lock switch 17 when an accident occurs. Because the size of the roof rail 18 is generally kept to a minimum to provide an aesthetic vehicle interior and to accommodate larger windows, the curtain airbag 20 is usually folded, rolled or otherwise gathered into a bundle having dimensions similar to those of the roof rail 18 before installation on the vehicle.

As the roof rail 18 and the curtain airbag 20 are often not visually appealing to the customer, a vehicle headliner 19 and/or decorative trim 25 are usually added to increase the aesthetic attractiveness of the vehicle interior 10. The headliner 19 is generally added to cover the roof of the vehicle while the edges of the headliner 19 descend to mask the area inboard of the roof rail 18. If the design of the vehicle interior 10 is such that the roof rail 18 is not completely covered by the headliner 19, the decorative trim 25 may be used to further cover the roof rail 18.

Generally, the curtain airbag 20 is attached to the vehicle to ensure that the curtain airbag 20 maintains a preferred position and orientation during deployment as well as during the normal operation of the vehicle. Thus, one or more airbag mounts 28 have been attached to the vehicle interior 10 to anchor the curtain airbag 20 to the vehicle interior 10.

The airbag mounts 28 generally comprise a plate 50 configured to mount the curtain airbag 20 to the vehicle interior 10. As used herein, the term "plate" means both a mounting structure that may be attached to a vehicle as well as a surface on the vehicle's body to which an airbag may be attached. Preferably, this plate 50 is made of the same steel used to make the roof rail 18. However, other materials may also be used in making the plate 50, such as metal, plastic, steel, or any other similar material that is capable of supporting the curtain airbag 20.

The plate 50 is additionally configured so as to be positioned longitudinally on or proximate the roof rail 18 such that the curtain airbag 20 becomes attached to the vehicle interior 10 along the roof rail 18. Preferably, the plate 50 is positioned on the roof rail 18 and is configured to hold the curtain airbag 20 tightly against the roof rail 18 such that the attached airbag 20 does not occupy or interfere with the space needed to properly assemble the headliner 19.

The plate 50 mounts the curtain airbag 20 to the vehicle interior 10 through the use of one or more first tabs 30 and one or more second tabs 32 which have been formed such that the airbag 20 can engage the first tabs 30 and the second tabs 32 so as to bind a portion of the airbag 20 to the plate 50.

Figure 2:
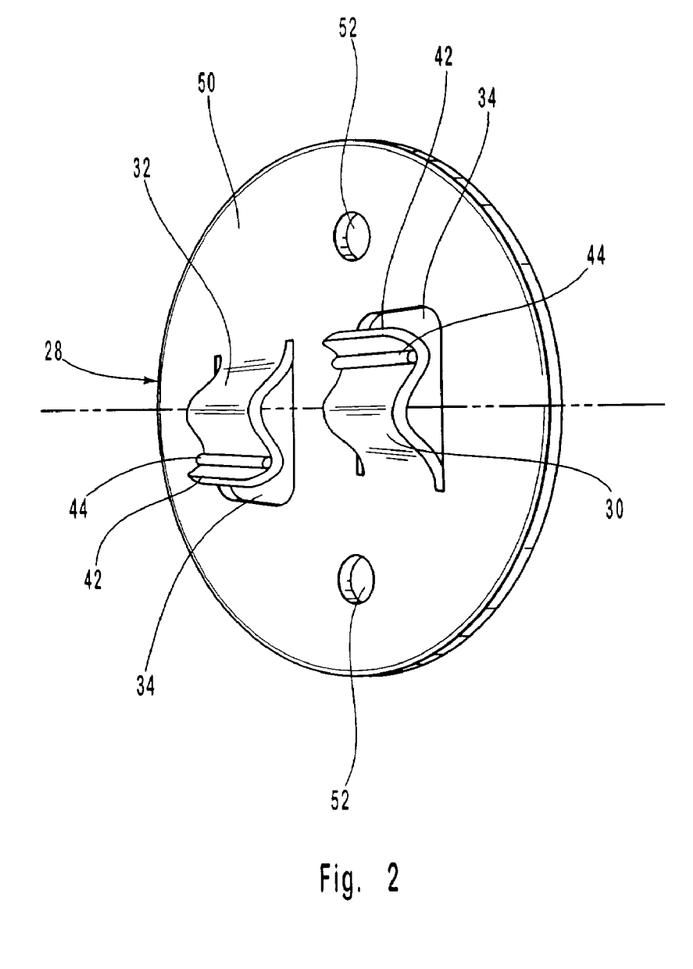
FIG. 2 is a perspective view illustrating one embodiment of the airbag mount of the present invention.

Referring now to FIG. 2, one embodiment of an airbag mount 28 comprising a plate 50 is illustrated. In this embodiment, the plate 50 is a mounting structure that may be attached to a vehicle and has first tabs 30 and second tabs 32 formed into the plate 50. "Formed into the plate" means that the first tabs 30 and the second tabs 32 have been molded, pressed, embedded, imprinted, cut, constructed, added, stamped, patterned, engraved, indented, etched, or otherwise arranged such that they are a part of the plate 50. Preferably, the first tabs 30 and the second tabs 32 have been formed into the plate 50 such that they are located at or proximate the center of the plate 50.

Normally, the embodiment of the plate 50 shown in FIG. 2 comprises a generally flat structure that is capable of being positioned on or proximate a side roof rail of a vehicle. The plate 50 may generally be made of any material capable of attaching and supporting an airbag such as steel, metal, plastic or other similar materials. In some instances, it is preferred that the same steel used to make the body of the vehicle be likewise used to make the plate 50.

The plate 50 may further be constructed such that the first tabs 30 and the second tabs 32 define a receiving area 34. The receiving area 34 is an area formed into the plate 50 that has been specifically configured such that it can receive and retain a portion of an airbag. Preferably, this receiving area 34 is an opening located behind the first tabs 30 and the second tabs 32 such that the receiving area 34 constitutes a hole or aperture in the plate 50 directly inward or inside of the first tabs 30 and the second tabs 32 that has been specifically sized to hold a portion of the airbag behind the first tabs 30 and the second tabs 32.

Both the first tabs 30 and the second tabs 32 are constructed such that an airbag can engage the first tabs 30 and the second tabs 32 in a way that causes a portion of the airbag to become bound to the plate 50. Preferably this is accomplished by constructing the first tabs 30 and the second tabs 32 such that they are curved. Having the first tabs 30 and the second tabs 32 be "curved" means that the center portion of the first tabs 30 and the second tabs 32 bows, bends, arches, bulges, or turns outwardly from the receiving area 34.

In addition to having a curved shape, the first tabs 30 and the second tabs 32 may also be constructed such that a tip 42 is attached to the distal ends of the first tabs 30 and the second tabs 32. The tip 42 is a section of the tabs 30, 32 that is specifically shaped to slant outwardly from the receiving area 34. Inclusion of such a tip 42 may indeed be preferable because, in some instances, the tip 42 can facilitate the binding of an airbag within the receiving area 34.

In the embodiment illustrated in FIG. 2, the first tabs 30 and the second tabs 32 are generally rectangular in shape. However, the first tabs 30 preferably differ from the second tabs 32 in the way in which they have been oriented on the plate 50. Specifically, the second tabs 32 are preferably oriented to be inverted relative to the first tabs 30. "Inverted relative to the first tabs" means that the second tabs 32 have been oriented such when the plate 50 is installed on a vehicle, the second tabs 32 face downwards whereas the first tabs 30 face upwards.

The first tabs 30 and the second tabs 32 are additionally constructed such that they do not tear or rip the airbag either during the installation of the airbag, the deployment of the airbag, or the normal use of the vehicle. Likewise, the first tabs 30 and the second tabs 32 are designed to have sufficient strength and structural integrity such that the airbag remains bound to the plate 50 during both the normal operation of the vehicle as well as during deployment of the airbag. Strengthening gussets 44 such as metal rods, rings, plates, and the like may also be added to further increase the structural integrity of the first tabs 30 and the second tabs 32.

The embodiment of the plate 50 shown in FIG. 2 is separate from the roof rail or other parts of the body of the vehicle. As such, in order for this embodiment of the plate 50 to mount an airbag, the plate 50 must first be properly positioned and attached to the interior of the vehicle. Such positioning within the vehicle occurs by having one or more connectors mount the plate 50 onto the vehicle's side roof rail through one or more attachment points 52. Alternatively, the positioning within the vehicle may occur by welding, gluing, or otherwise affixing the plate 50 to the vehicle's side roof rail.

Figure 3:
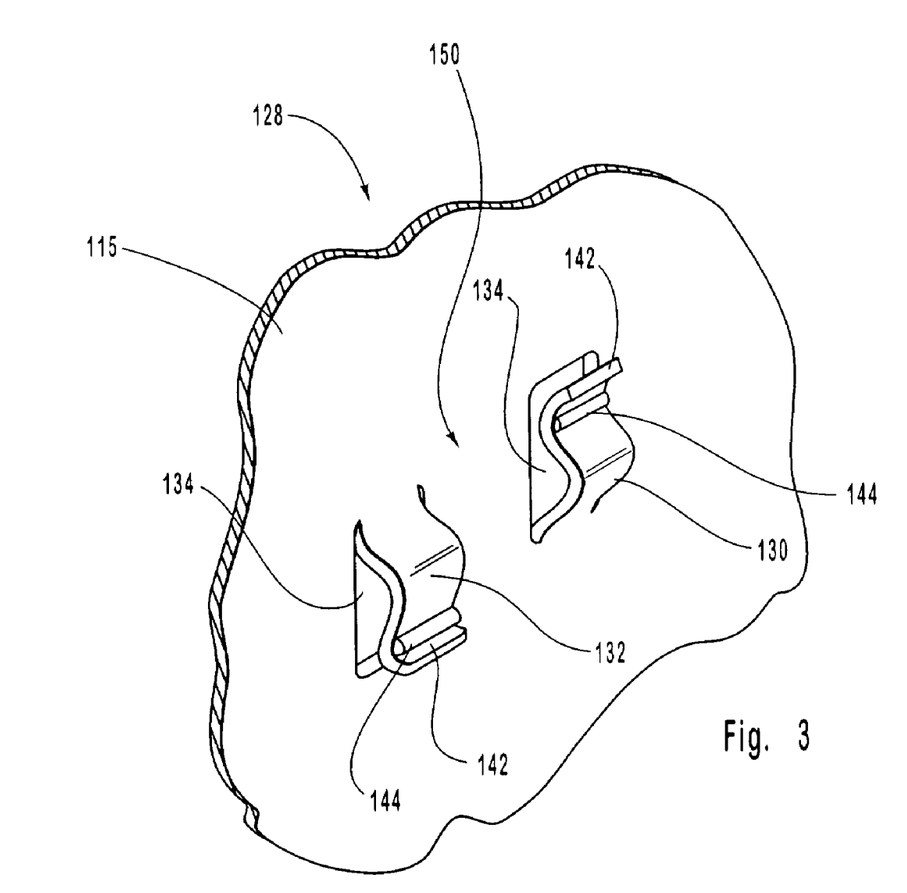
FIG. 3 is a perspective view illustrating a different embodiment of the airbag mount of the present invention.

Referring now to FIG. 3, a different embodiment of an airbag mount 128 is shown. In this embodiment, the airbag mounts 128 attach an airbag to an interior of a vehicle via a system similar to that which was described above. More specifically, the airbag mounts 128 are designed to attach an airbag to a portion of the vehicle's body 115. Preferably, the airbag mounts 128 are configured to attach the airbag on or proximate to the vehicle's roof rail 18.

As with the embodiment previously described, the mount 128 comprises a plate 150 having one or more first tabs 130 and one or more second tabs 132. These first tabs 130 and second tabs 132 are configured such that an airbag can engage the first tabs 130 and second tabs 132 such that a portion of the airbag becomes bound to the plate 150. More specifically, the first tabs 130 and the second tabs 132 are configured such that an airbag can engage the first tabs 130 and second tabs 132 such that a portion of the airbag becomes bound to a receiving area 134 which is formed into the plate 150. This receiving area 134 is an area of the plate 150 that is defined by the tabs 130, 132 and is specifically sized to hold a portion of the airbag behind the tabs 130, 132. Preferably the receiving area 134 is an opening located behind the tabs 132, 134 such that a portion of the airbag becomes bound to the plate 150 directly inward or inside of the first tabs 130 and the second tabs 132.

Moreover, like the prior embodiment, the first tabs 130 and the second tabs 132 depicted in FIG. 3 are preferably configured to be curved. This configuration means that the first tabs 130 and the second tabs 132 are constructed such that the center portion of the first tabs 130 and the second tabs 132 bows, bends, arches, bulges, or turns outwardly from the receiving area 134.

In addition, a tip 142 may also be attached to the distal ends of the first tabs 130 and the second tabs 132. This tip 142 is configured to slant outwardly from the receiving area 134 and is preferably added to the tabs 130, 132 because it facilitates an airbag engaging the first tabs 130 and the second tabs 132 in a way that binds and holds a portion the airbag within the receiving area 134. Such an ability to hold an airbag within the receiving area 134 may further be augmented by adding strengthening gussets 144 such as metal rods, rings, plates or the like to the tabs 130, 132.

Although much of the structure and function of the airbag mount 128 shown in FIG. 3 is similar to that which is described above, there are indeed significant difference between this embodiment and the previous embodiment depicted in FIG. 2. The most striking of these differences is the way in which the plates have been attached to the vehicle interior. In FIG. 2, the plate was positioned within the vehicle by connecting the plate on or near the roof rail through fasteners or other connectors. Conversely, in the embodiments shown in FIG. 3, the plate 150 comprises a surface of the vehicle body 115 to which an airbag may be attached. Such a surface of the vehicle's body is preferably located on or proximate the vehicle's roof rail. However, other surfaces and/or portions of the vehicle body 115 may also be used to comprise the plate 150.

As the plate 150 shown in FIG. 3 comprises a surface of the vehicle's body 115, the first tabs 130, the second tabs 132, and/or the he receiving area 134 are included as part of the vehicle body 115. Preferably, this is accomplished by modifying the vehicle's body 115 such that the tabs 130, 132 and the receiving area 134 are stamped into the vehicle body 115. "Stamped into the vehicle's body" means that the tabs 130, 132 and the receiving area 134 have been molded, pressed, embedded, imprinted, cut, formed, patterned, constructed, included, or otherwise added into the vehicle's body 115 such that tabs 130, 132 and the receiving area 134 form part of the vehicle's body 115.

The embodiment of the plate 50 shown in FIG. 3 is a preferred embodiment of the present invention because by having the plate 150 comprise a surface of the vehicle's body 115, fewer parts are required to make the airbag system which in turn, reduces the overall cost and weight of the vehicle. Moreover, by having the plate 150 comprise a surface of the vehicle's body 115, it is possible to mount an airbag to the vehicle without the use of connectors. As a result, the limitations and drawbacks associated with the use of connectors within the airbag mounting system are effectively eliminated.

Figure 4:
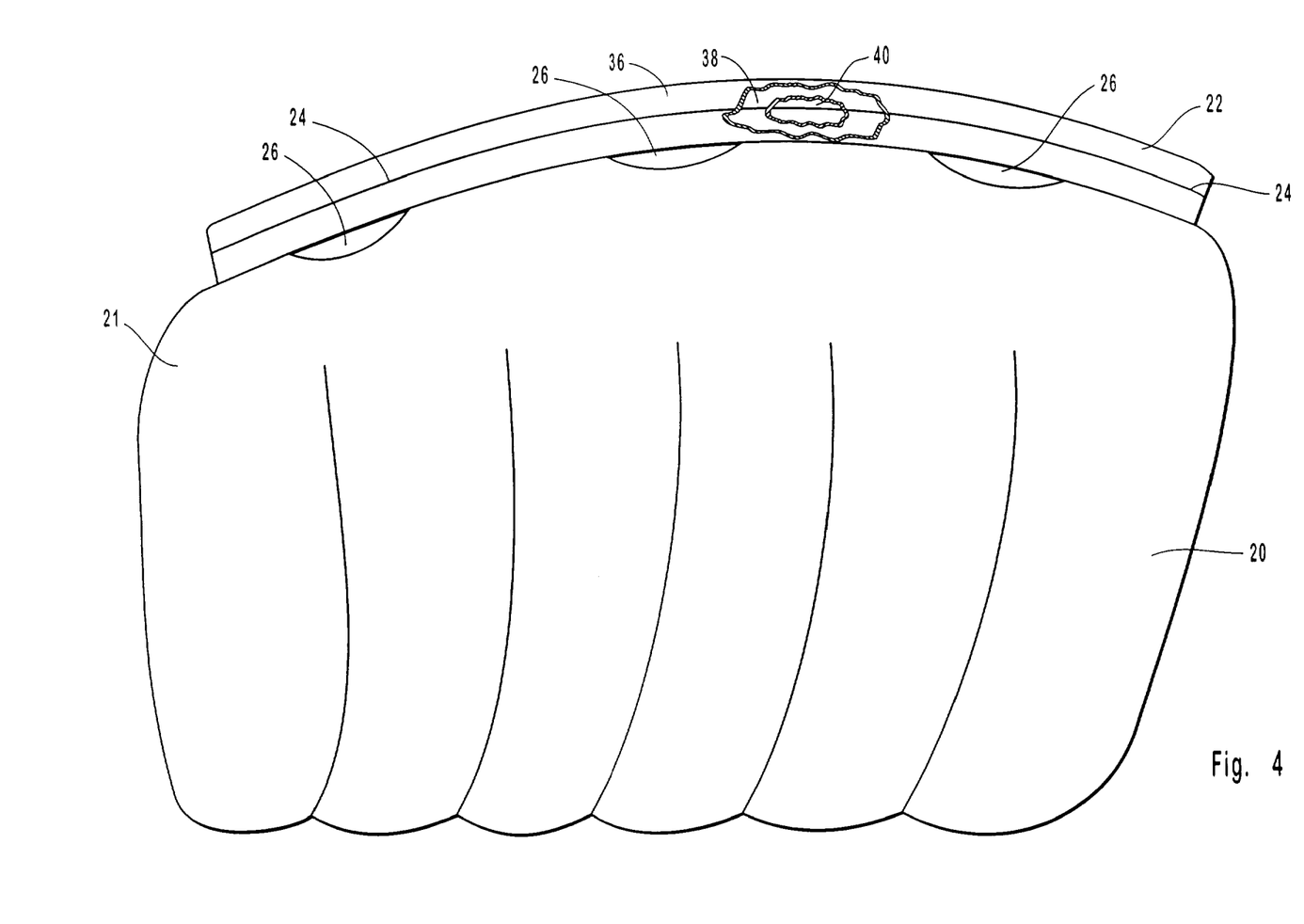
FIG. 4 is a perspective view illustrating a curtain airbag capable of being mounted to a vehicle roof rail by the airbag mount of the present invention.

Referring now to FIG. 4, a curtain airbag 20 capable of use with the method and mounting system of the present invention is depicted in its inflated and deployed configuration. Preferably, this curtain airbag 20 has been sized and prearranged such that if installed in a vehicle proximate a side roof rail, the curtain airbag 20 will protect a vehicle occupant during a crash from harmful impact with the side of the vehicle.

The curtain airbag 20 is generally made of a flexible material known in the art of airbag manufacturing, such as a nylon fabric. Preferably, the curtain airbag 20 has been made by having sections of the flexible material sewn, woven, or welded together so as to form a side-impact inflatable curtain airbag.

The curtain airbag 20 includes comprise an inflating portion 21 which is an enclosed section of the airbag 20 configured to receive and be inflated by the gas produced by the inflator (not shown). It is this inflating portion 21 that inflates during a crash such that it substantially covers the side of the vehicle.

In addition to the inflating portion, the airbag 20 may also be made to include a hemmed portion 22 positioned adjacent to the inflating portion 21. Preferably, the hemmed portion 22 is positioned above the inflating portion 21.

The hemmed portion 22 generally comprises flat section of the curtain airbag 20 that is constructed of one or more layers of a flexible airbag material. Preferably the same flexible material that was used to make the curtain airbag 20 is also used to make the hemmed portion 22. However, some embodiments may be made in which the flexible material used to make the hemmed portion 22 is different than the flexible material used to make the curtain airbag 20.

As illustrated in FIG. 4, the hemmed portion 22 is made up of three layers of nylon fabric, a first layer 36, a second layer 38, and a third layer 40 which have been connected together through sewing along the hem 24. Of course, other variations and embodiments of the hemmed portion 22 may be constructed. For example, the hemmed portion 22 may comprise more than three layers of nylon fabric. Still other embodiments of the hemmed portion 22 may comprise fewer than three layers of nylon fabric. In addition, the layers of the nylon fabric used to make the hemmed portion 22 be connected together through methods other than sewing along a hem 24, such as through welding, stitching, weaving, gluing, heat-staking, or the like.

The curtain airbag 20 may also be designed such that the airbag 20 comprises one or more slits 26. These slits 26 are generally holes or openings located between the hemmed portion 22 and the inflating portion 21. More specifically, the slits 26 are located between the hemmed portion 22 and the inflating portion 21 such that the slits 26 do not affect the ability of the inflating portion 21 to be inflated by the gas produced by the inflator (not shown).

Preferably, the slits 26 are positioned on the airbag 20 such that if the airbag 20 is installed on the vehicle, the position of the slits 26 directly correspond to the position of the vehicle's one or more airbag mounts. Similarly, it is also preferable that the slits 26 be configured to be larger than the airbag mounts that have been positioned on the vehicle.

Figure 5:
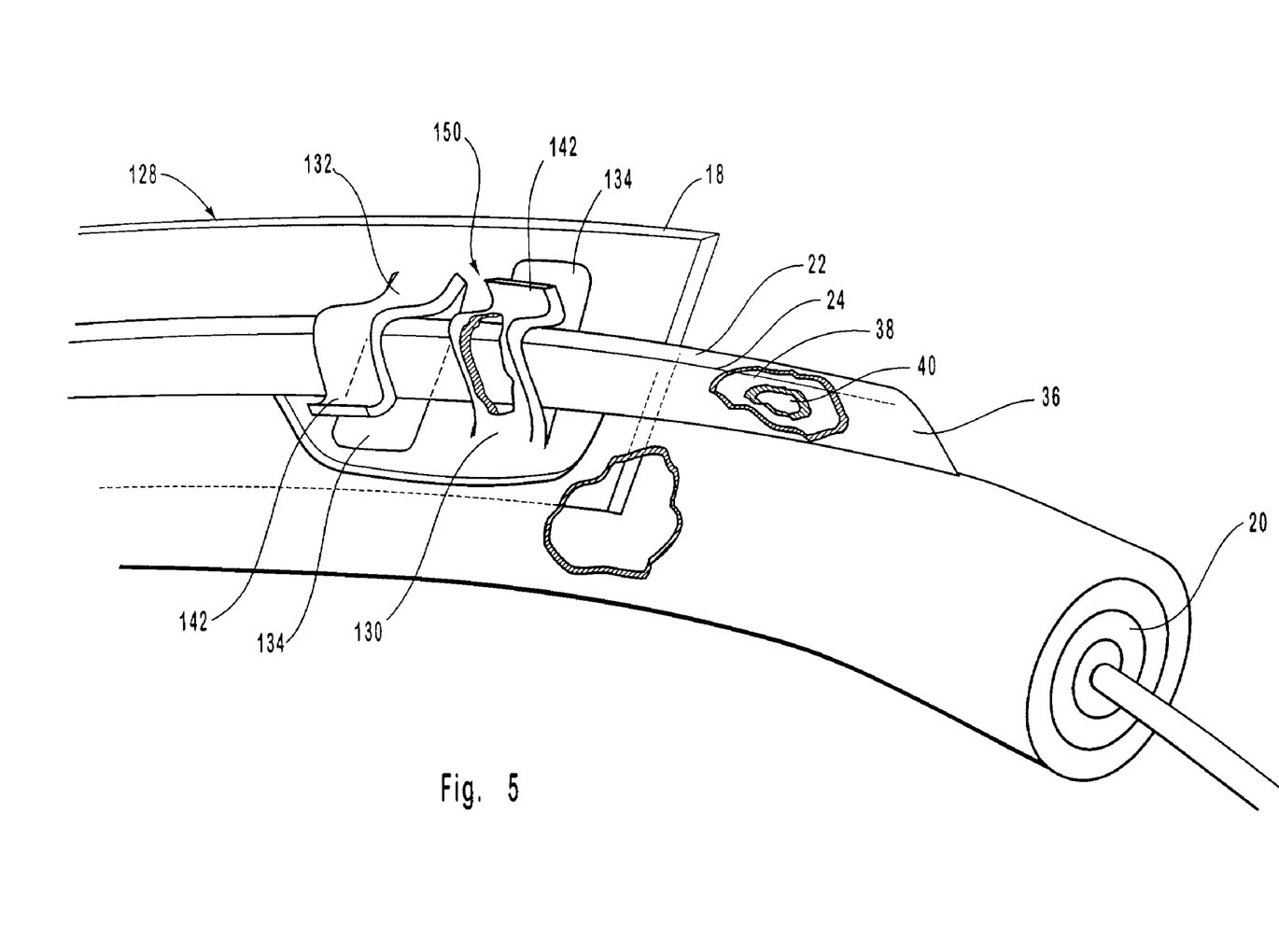
FIG. 5 is a perspective view illustrating one embodiment of the mount of the present invention attaching a curtain airbag to a vehicle roof rail.

Referring now to FIG. 5, the way in which one embodiment of the present invention functions to attach a curtain airbag 20 to a vehicle is depicted in greater detail. FIG. 5 shows the embodiment of the plate 150 that has been formed from a surface of the vehicle's roof rail 18 used as a medium for connecting a curtain airbag 20 (shown in its stowed configuration) to a vehicle.

In FIG. 5, the plate 150 comprises a surface of the vehicle's roof rail 18. As such, the first tabs 130, the second tabs 132, and/or the receiving area 134 have been included as part of the roof rail 18. The airbag 20 is attached by having the first tabs 130 and the second tabs 132 configured such that the airbag 20 engages the first tabs 130 and the second tabs 132 so as to cause a portion of the hemmed portion 22 to become bound to the plate 150. Preferably, the first tabs 130 and the second tabs 132 are configured such that the airbag 20 engages the first tabs 130 and the second tabs 132 such that a portion of the hemmed portion 22 becomes bound within the receiving area 134 formed into the plate 150. Once the hemmed portion 22 has been bound within the receiving area 134, the first tabs 130 and the second tabs 132 are configured such that the airbag 20 is held and bound to the plate 150 during the normal operation and life of the vehicle. In addition, the first tabs 130 and the second tabs 132 are likewise configured such that the airbag 20 remains bound to the plate 150 during an accident in which the airbag 20 is deployed into the inflated configuration.

In order to further engage and bind the curtain airbag 20, the first tabs 130 may be positioned such that the slits 26 engage the first tabs 130. Conversely, as the second tabs 132 are inverted relative to the first tabs 130, they are positioned such that the slits 26 do not engage the second tabs 132. In this configuration of the second tabs 132, the airbag 20 is prevented from engaging the second tabs 132 is the same way in which the airbag engages the first tabs 130. Such a configuration of the second tabs 132 is nevertheless preferable because it ensures that the airbag 20 engages the first tabs 130 and second tabs 132 in a way that accommodates for any vertical vibrations that might otherwise cause the curtain airbag 20 to separate from the plate 150 during the deployment process.

Referring now generally to FIGS. 1-5, the present invention also provides for an efficient method for installing a side curtain airbag 20 to an interior of a vehicle 10. First one or more airbag mounts 28, 128 of the present invention are provided. These airbag mounts 28, 128 include either the embodiment shown as plate 50 having first and second tabs 30, 32, or the embodiment shown as plate 150 with the first and second tabs 130, 132. Next, the plates 50, 150 are positioned within the vehicle. If plates 50 are used, this involves connecting the plates 50 to the vehicle interior 10 through one or more connectors. However, if the plates 150 are used, this is preferably accomplished by constructing the plate 150 such that is comprises a surface of the vehicle's body 115. Next, a curtain airbag 20 having one or more slits 26 and a hemmed portion 22 is provided. Attachment of the curtain airbag 20 to the vehicle interior 10 then occurs in one step by having the airbag engage the first tabs 30, 130 and the second tabs 32, 132 such that a portion of the hemmed portion becomes bound to the plate 50, 150. More specifically, the curtain airbag 20 engages the first tabs 30, 130 and the second tabs 32, 132 such that the hemmed portion 22 of the curtain airbag 20 becomes bound within a receiving area 34, 134.

In summary, the present invention provides a mount and method of attaching an airbag to a vehicle that is simple, inexpensive, and does not require the use of connectors to attach the airbag. The airbag mounts generally include a plate positioned within a vehicle having first tabs and second tabs. The plate functions to attach an airbag to a vehicle interior through the first tabs and second tabs which are specifically configured such that the airbag can engage the first and second tabs such that a portion of the airbag becomes bound to the plate.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A mount for attaching an airbag to a vehicle comprising:
    a plate having one or more first tabs and one or more second tabs, the second tabs being inverted relative to the first tabs, wherein an airbag can engage the first and second tabs so as to bind a portion of the airbag to the plate and wherein the plate is positioned on the roof rail of the vehicle.

2. A mount as in claim 1 wherein the plate is a surface of the vehicle's body.

3. A mount as in claim 2 wherein the first tabs and the second tabs are stamped into the vehicle's body.

4. A mount as in claim 1 wherein the plate is separate from the body of the vehicle.

5. A mount as in claim 1 wherein the plate is connected to the vehicle via connectors.

6. A mount as in claim 1 wherein the first tabs and the second tabs are made of steel.

7. A mount as in claim 1 wherein the first tabs and the second tabs are made of plastic.

8. A mount as in claim 1 wherein the first tabs and the second tabs are generally rectangular.

9. A mount as in claim 1 wherein the first tabs and the second tabs further comprise a tip.

10. A mount as in claim 1 wherein the first tabs and the second tabs further comprise strengthening gussets.

11. A mount as in claim 1 wherein the first tabs and the second tabs are curved.

12. A mount as in claim 1 wherein the first tabs and the second tabs define a receiving area.

13. A mount as in claim 12 wherein the receiving area comprises an opening located behind the first tabs and the second tabs.

14. A mount for attaching an airbag to a vehicle comprising:
    a plate having one or more first tabs and one or more second tabs, the second tabs being inverted relative to the first tabs; and
    a receiving area being defined by the first and second tabs, wherein the first tabs and the second tabs are configured such that an airbag can engage the first and second tabs so as to bind a portion of the airbag within the receiving area and wherein the plate is positioned on the roof rail of the vehicle.

15. A mount as in claim 14 wherein the plate is a surface of the vehicle's body.

16. A mount as in claim 15 wherein the first tabs and the second tabs are stamped into the vehicle's body.

17. A mount as in claim 14 wherein the plate is separate from the body of the vehicle.

18. A mount as in claim 14 wherein the first tabs and the second tabs further comprise a tip.

19. A mount as in claim 14 wherein the receiving area comprises an opening located behind the first tabs and the second tabs.

20. A mounting system for attaching an airbag to a vehicle comprising
    an airbag having one or more slits; and
    a plate having one or more first tabs and one or more second tabs configured to define a receiving area, the second tabs being inverted relative to the first tabs, wherein the slits engage the first tabs and second tabs such that a portion of the airbag becomes bound within the receiving area.

21. A mounting system as in claim 20 wherein the airbag slits engage the first tabs.

22. A mounting system as in claim 20 wherein the plate has been stamped into the roof rail of the vehicle.

23. A mounting system as in claim 20 wherein the plate is separate from the body of the vehicle.

24. A mounting system as in claim 20 wherein the first tabs and the second tabs further comprise a tip.

25. A mounting system as in claim 20 wherein the airbag is a inflatable curtain airbag.

26. A mounting system as in claim 20 wherein the airbag further comprises a hemmed portion.

27. A mounting system as in claim 26 wherein the hemmed portion comprises layers of fabric that have been connected through sewing.

28. A mounting system as in claim 26 wherein the hemmed portion comprises layers of fabric that have been connected through welding.

29. A mounting system as in claim 26 wherein the hemmed portion comprises layers of fabric that have been connected through weaving.

30. An airbag configured to be attached to a vehicle through an airbag mount having a plate, said plate having one or more first tabs and one or more second tabs, the second tabs being inverted relative to the first tabs, the airbag comprising:
    a hemmed portion; and
    one or more slits configured to engage the first tabs so as to bind a portion of the airbag to the plate.

31. An airbag as in claim 30 wherein the hemmed portion comprises layers of fabric that have been connected through sewing.

32. An airbag as in claim 30 wherein the hemmed portion comprises layers of fabric that have been connected through welding.

33. An airbag as in claim 30 where the hemmed portion comprises layer of fabric that have been connected through weaving.

34. An airbag as in claim 30 wherein the portion of the airbag that is bound to the plate is the hemmed portion.

35. A method of installing an airbag onto a vehicle comprising the steps of:

providing an airbag mount having a plate with one or more first tabs and one or more second tabs configured to be inverted relative to the first tabs;

positioning the mount in the vehicle;

providing an airbag having one or more slits and a hemmed portion; and attaching the airbag to the plate by having the slits engage the first tabs and the second tabs such that a portion of the airbag is bound to the plate.

36. A method as in claim 35 wherein the positioning step comprises constructing the plate such that it comprises a surface of the vehicle's body.

37. A method as in claim 35 wherein the positioning step comprises attaching the plate to the vehicle interior vehicle via one or more connectors.

38. A method as in claim 35 wherein the attaching step further comprises having the airbag slits engage the first tabs.

39. A method as in claim 35 wherein the plate further comprises a receiving area which is defined by the first tabs and the second tabs, wherein the attaching step further comprises having the airbag engage first tabs and the second tabs such that the portion of the airbag is bound to the plate through the receiving area.

40. A method as in claim 35 wherein the portion of the airbag that becomes bound to the plate during the attachment step is the hemmed portion.

* * * * *